United States Patent
Onishi et al.

(10) Patent No.: US 12,216,075 B2
(45) Date of Patent: Feb. 4, 2025

(54) GAS SENSOR ELEMENT AND GAS SENSOR

(71) Applicant: NGK INSULATORS, LTD., Aichi (JP)

(72) Inventors: Ryo Onishi, Iwakura (JP); Yasuhide Kojima, Nagoya (JP); Yusuke Watanabe, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 622 days.

(21) Appl. No.: 17/482,648

(22) Filed: Sep. 23, 2021

(65) Prior Publication Data
US 2022/0011260 A1 Jan. 13, 2022

Related U.S. Application Data

(63) Continuation of application No. PCT/JP2020/010056, filed on Mar. 9, 2020.

(30) Foreign Application Priority Data

Mar. 29, 2019 (JP) .................. 2019-067137

(51) Int. Cl.
*G01N 27/407* (2006.01)
*G01M 15/10* (2006.01)

(52) U.S. Cl.
CPC ...... *G01N 27/4077* (2013.01); *G01M 15/102* (2013.01)

(58) Field of Classification Search
CPC .................................. G01N 27/4077
See application file for complete search history.

(56) References Cited

U.S. PATENT DOCUMENTS

| | | | |
|---|---|---|---|
| 2012/0248071 A1 | 10/2012 | Ikoma et al. | |
| 2016/0018357 A1* | 1/2016 | Nishijima | G01N 27/4067 204/424 |
| 2016/0161445 A1 | 6/2016 | Sakakibara et al. | |
| 2016/0282298 A1* | 9/2016 | Hino | G01N 27/4077 |
| 2021/0248071 A1 | 8/2021 | Jung et al. | |

FOREIGN PATENT DOCUMENTS

| | | |
|---|---|---|
| JP | 2003-262608 A | 9/2003 |
| JP | 2004-219232 A | 8/2004 |
| JP | 2012-210637 A | 11/2012 |
| JP | 2016-065853 A | 4/2016 |
| JP | 2016-109685 A | 6/2016 |

OTHER PUBLICATIONS

International Preliminary Report on Patentability received in corresponding International Application No. PCT/JP2020/010056 dated Oct. 14, 2021.
International Search Report of PCT/JP2020/010056 dated May 26, 2020.

* cited by examiner

*Primary Examiner* — C. Sun
(74) *Attorney, Agent, or Firm* — MATTINGLY & MALUR, PC

(57) ABSTRACT

A gas sensor element includes an element body including an oxygen-ion-conductive solid electrolyte layer; and a protective layer that covers at least part of the element body, and has a thermal conductivity ratio R of 1.6 or higher, the thermal conductivity ratio R ($=\lambda s/\lambda t$) being a surface direction thermal conductivity $\lambda s$ [W/m K] to a thickness direction thermal conductivity $\lambda t$ [W/m K].

6 Claims, 4 Drawing Sheets

Measurement-object gas →

(= Surface direction thermal conductivity $\lambda s$ /
Thickness direction thermal conductivity $\lambda t$)

GAS SENSOR ELEMENT AND GAS SENSOR

CROSS-REFERENCE TO RELATED APPLICATION

This application is a continuation application of PCT/JP2020/010056, filed on Mar. 9, 2020, which claims the benefit of priority of Japanese Patent Application No. 2019-067137, filed on Mar. 29, 2019, the entire contents of which are incorporated herein by reference.

BACKGROUND OF THE INVENTION

1. Field of the Invention

The present invention relates to a gas sensor element and a gas sensor.

2. Description of the Related Art

A conventional gas sensor has been known which detects the concentration of a predetermined gas such as NOx in a measurement-object gas, such as an exhaust gas of automobiles. In addition, it is known that a porous protective layer is formed on the surface of a sensor element in such a gas sensor. For example, PTL 1, 2 state that a porous protective layer is formed by causing heat-resistant particles, such as alumina, to adhere to the surface of a sensor element by plasma thermal spray. Formation of the porous protective layer can reduce breakage of the sensor element due to adhesion of water in a measurement-object gas, for example.

CITATION LIST

Patent Literature

PTL 1: JP 2016-109685 A
PTL 2: JP 2016-065853 A

SUMMARY OF THE INVENTION

The temperature of the sensor element of such a gas sensor is high (for example, 800° C.) at the time of normal driving, and it has been desired that breakage of the sensor element caused by sudden cooling due to adhesion of water be further reduced.

The present invention has been devised to solve such a problem and it is a main object to improve the waterproofing performance of the gas sensor element.

The present invention adopts the following device to achieve the above-mentioned main object.

A gas sensor element of the present invention includes:
an element body including an oxygen-ion-conductive solid electrolyte layer; and
a protective layer that covers at least part of the element body, and has a thermal conductivity ratio R of 1.6 or higher, the thermal conductivity ratio R ($=\lambda s/\lambda t$) being a surface direction thermal conductivity $\lambda s$ [W/m K] to a thickness direction thermal conductivity $\lambda t$ [W/m K].

In the gas sensor element, at least part of the element body is covered by a protective layer. Here, the higher the thermal conductivity ratio R (=surface direction thermal conductivity $\lambda s$/thickness direction thermal conductivity $\lambda t$) of the protective layer, thermal conduction in a surface direction (direction perpendicular to a thickness direction) of the protective layer is more likely to occur than thermal conduction in a thickness direction of the protective layer. Thus, when water adheres to the surface of the protective layer, the occurrence of sudden cooling of only part of the element body is reduced. Since the thermal conductivity ratio R is 1.6 or higher, the effect of reducing the occurrence of crack due to sudden cooling of only part of the element body, in other words, the effect of improving the waterproofing performance of the gas sensor element is obtained.

In the gas sensor element of the present invention, the thickness direction thermal conductivity $\lambda t$ of the protective layer may be 1.6 W/mK or lower.

In the gas sensor element of the present invention, the thickness of the protective layer may be 300 μm or more. When the thickness is 300 μm or more, the waterproofing performance of the gas sensor element is unlikely to be insufficient. The thickness of the protective layer may be 400 μm or less.

The gas sensor element of the present invention includes an outer side electrode disposed outside of the element body, and the protective layer may cover at least the outer side electrode. In this manner, the protective layer can also serve the function of protecting the outer side electrode against poisoning substances contained in a measurement-object gas.

In the gas sensor element of the present invention, the element body has an elongate rectangular parallelepiped shape, and the protective layer may cover one end face of the element body in a longitudinal direction, and the region from the one end face side of four faces perpendicular to the one end face up to a distance L of the element body in the longitudinal direction (where 0<the distance L<the length of the element body in the longitudinal direction). The protective layer covers five faces in this manner, thus the waterproofing performance of the gas sensor element is further improved, as compared with when the protective layer covers only 4 faces of less, for example.

The gas sensor of the present invention includes the gas sensor element in one of the aspects described above. Thus, with this gas sensor, the same effect as that of the gas sensor element of the present invention described above, for example, the effect of improving the waterproofing performance of the gas sensor element is obtained. The gas sensor of the present invention may include a fixing member that fixes the gas sensor element, and a protective cover that covers one end of the gas sensor element in the longitudinal direction.

BRIEF DESCRIPTION OF THE DRAWINGS

FIG. 4 is an explanatory view illustrating a surface direction and a thickness direction of a porous protective layer 91a.

DETAILED DESCRIPTION OF THE INVENTION

Figure 1:
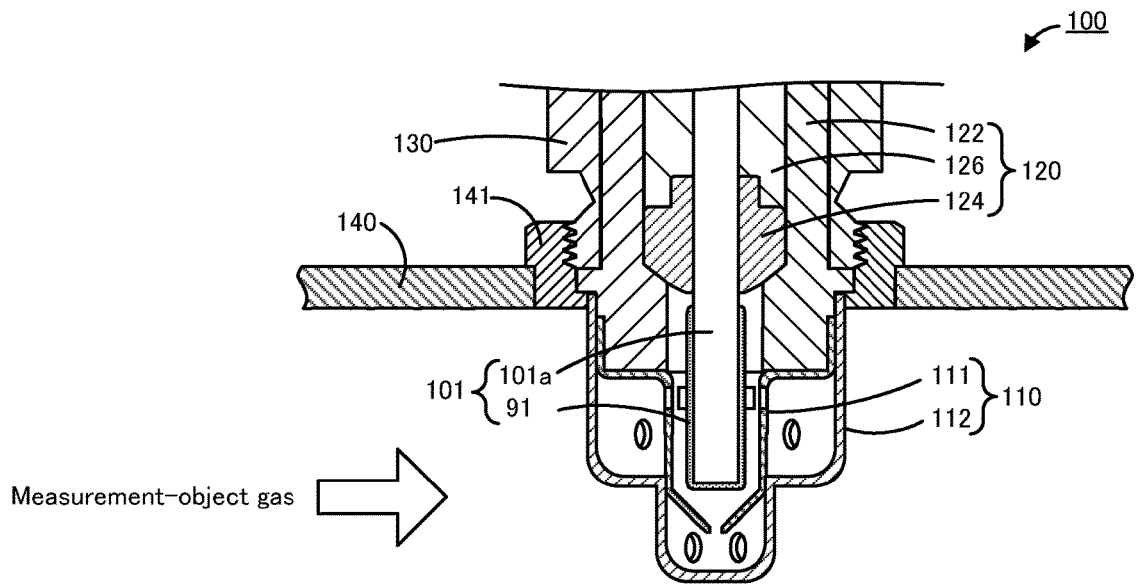
FIG. 1 is a vertical cross-sectional view of a gas sensor 100.
Figure 2:
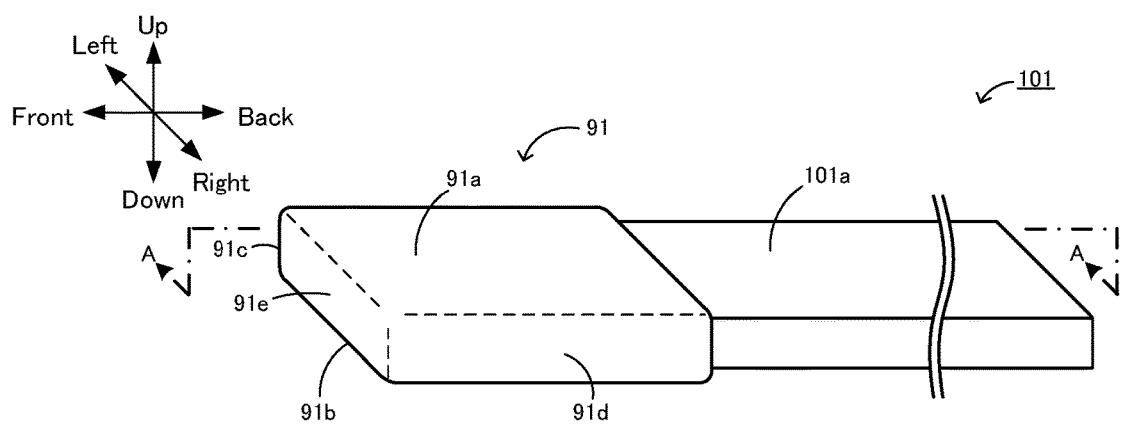
FIG. 2 is a perspective view schematically illustrating an example of the configuration of a sensor element 101.
Figure 3:
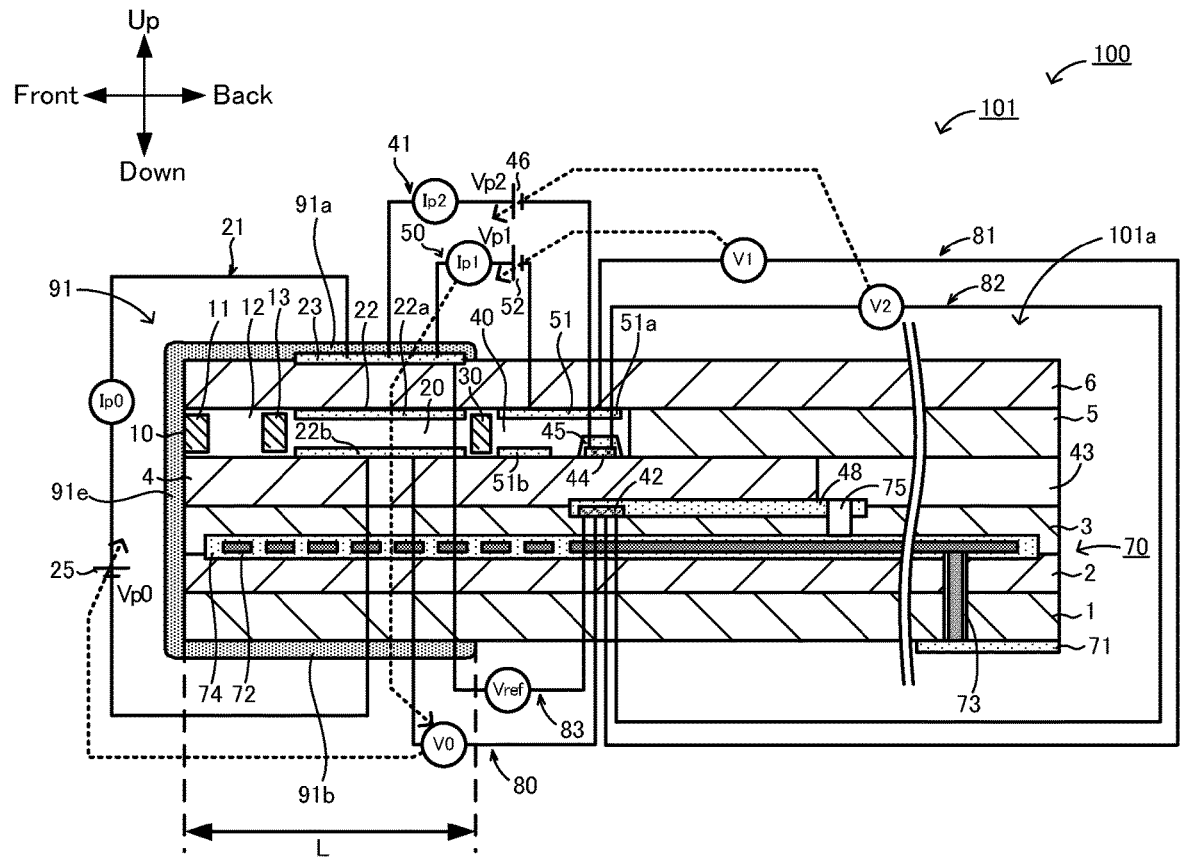
FIG. 3 is a cross-sectional view taken along A-A of FIG. 2.

Next, an embodiment of the present invention will be described using the drawings. FIG. 1 is a vertical cross-sectional view of a gas sensor 100 which is an embodiment of the present invention, FIG. 2 is a perspective view schematically illustrating an example of the configuration of a sensor element 101, and FIG. 3 is a cross-sectional view taken along A-A of FIG. 2. The structure of the gas sensor 100 as illustrated in FIG. 1 is publicly known, and is described, for example, in Japanese Unexamined Patent Application Publication No. 2012-210637.

The gas sensor 100 includes a sensor element 101, a protective cover 110 that covers and protects one end (the lower end in FIG. 1) of the sensor element 101 in the longitudinal direction, an element sealing body 120 that seals and fixes the sensor element 101, and a nut 130 attached to the element sealing body 120. As illustrated, the gas sensor 100 is mounted on an installed pipe 140, such as an exhaust gas pipe of a vehicle, for example, and is used to measure the concentration of a specific gas (NOx in the present embodiment) contained in the exhaust gas as a measurement-object gas. The sensor element 101 includes an element body 101a, and a porous protective layer 91 that covers the element body 101a.

The protective cover 110 includes an inner protective cover 111 having a bottom-equipped tubular shape and covering one end of the sensor element 101, and an outer protective cover 112 having a bottom-equipped tubular shape and covering the inner protective cover 111. A plurality of holes for allowing the measurement-object gas to flow into the protective cover 110 is formed in the inner protective cover 111 and the outer protective cover 112. The one end of the sensor element 101 is positioned in a space that is surrounded by the inner protective cover 111.

The element sealing body 120 includes a cylindrical main metal fitting 122, a ceramic-made supporter 124 enclosed in a through-hole inside the main metal fitting 122, and a powder compact 126 that is obtained by molding powder of ceramic such as talc, and that is enclosed in the through-hole inside the main metal fitting 122. The sensor element 101 is positioned to lie on a center axis of the element sealing body 120 and to penetrate through the element sealing body 120 in a front-back direction. The powder compact 126 is compressed between the main metal fitting 122 and the sensor element 101. Thus, the powder compact 126 not only seals the through-hole inside the main metal fitting 122, but also fixedly holds the sensor element 101.

The nut 130 is fixed coaxially with the main metal fitting 122 and includes a male thread portion formed on an outer peripheral surface. The male thread portion of the nut 130 is inserted in an attachment member 141 that is welded to the pipe 140 and that includes a female thread portion formed in its inner peripheral surface. Thus, the gas sensor 100 can be fixed to the pipe 140 in a state in which a portion of the sensor element 101 including the one end thereof and the protective cover 110 are projected into the pipe 140.

The element body 101a of the sensor element 101 has an elongate rectangular parallelepiped shape as illustrated in FIGS. 2 and 3. The sensor element 101 is described in more detail below. For convenience of explanation, the longitudinal direction of the sensor element 101 is called a front-back direction, the thickness direction of the sensor element 101 is called an up-down direction, and the width direction of the sensor element 101 is called a left-right direction.

As illustrated in FIG. 3, the sensor element 101 is an element having a structure in which six layers, namely a first substrate layer 1, a second substrate layer 2, a third substrate layer 3, a first solid electrolyte layer 4, a spacer layer 5, and a second solid electrolyte layer 6, each layer being made of a solid electrolyte with oxygen ion conductivity, such as zirconia ($ZrO_2$), are successively laminated in the mentioned order from the lower side as viewed on the drawing. In addition, the solid electrolyte forming those six layers is so dense as to be air-tight. The sensor element 101 having the above structure is manufactured, for example, by performing predetermined treatments and printing of circuit patterns on ceramic green sheets corresponding to the individual layers, laminating those ceramic green sheets, and then firing them into an integral body.

In one end portion (end portion in the forward direction) of the sensor element 101, a gas inlet port 10, a first diffusion rate controlling portion 11, a buffer space 12, a second diffusion rate controlling portion 13, a first inner cavity 20, a third diffusion rate controlling portion 30, and a second inner cavity 40 are successively adjacently formed in the mentioned order in communication with each other between a lower surface of the second solid electrolyte layer 6 and an upper surface of the first solid electrolyte layer 4.

The gas inlet port 10, the buffer space 12, the first inner cavity 20, and the second inner cavity 40 are each constituted as an inner space of the sensor element 101, which is formed by hollowing out the spacer layer 5, and which is defined at a top by the lower surface of the second solid electrolyte layer 6, at a bottom by the upper surface of the first solid electrolyte layer 4, and at a side by a side surface of the spacer layer 5.

The first diffusion rate controlling portion 11, the second diffusion rate controlling portion 13, and the third diffusion rate controlling portion 30 are each provided as a pair of two horizontally elongate slits (each given by an opening having the longitudinal direction in a direction perpendicular to the drawing sheet). A portion ranging from the gas inlet port 10 to the second inner cavity 40 is also called a gas flow portion.

At a position farther away from the front end side than the gas flow portion, a reference gas inlet space 43 is formed in a region between an upper surface of the third substrate layer 3 and a lower surface of the spacer layer 5 with a side of the reference gas inlet space 43 being defined by a side surface of the first solid electrolyte layer 4. For example, the atmosphere is introduced as reference gas to the reference gas inlet space 43 when the NOx concentration is measured.

An atmosphere inlet layer 48 is a layer made of porous ceramic, and the reference gas is introduced to the atmosphere inlet layer 48 through the reference gas inlet space 43. The atmosphere inlet layer 48 is formed so as to cover a reference electrode 42.

The reference electrode 42 is formed in a state sandwiched between the upper surface of the third substrate layer 3 and the first solid electrolyte layer 4, and the atmosphere inlet layer 48 in communication with the reference gas inlet space 43 is disposed around the reference electrode 42 as described above. Furthermore, as described later, an oxygen concentration (oxygen partial pressure) in each of the first inner cavity 20 and the second inner cavity 40 can be measured using the reference electrode 42.

In the gas flow portion, the gas inlet port 10 is opened to an external space such that the measurement-object gas is taken into the sensor element 101 from the external space through the gas inlet port 10. The first diffusion rate controlling portion 11 applies predetermined diffusion resistance to the measurement-object gas having been taken in through the gas inlet port 10. The buffer space 12 is a space for introducing the measurement-object gas, which has been introduced from the first diffusion rate controlling portion 11, to the second diffusion rate controlling portion 13. The second diffusion rate controlling portion 13 applies predetermined diffusion resistance to the measurement-object gas introduced to the first inner cavity 20 from the buffer space 12. When the measurement-object gas is introduced up to the first inner cavity 20 from the outside of the sensor element 101, the measurement-object gas having been abruptly taken into the sensor element 101 through the gas inlet port 10 due to pressure fluctuations of the measurement-object gas in the external space (i.e., due to pulsations of exhaust pressure when the measurement-object gas is automobile exhaust gas) is not directly introduced to the first inner cavity 20, but it is introduced to the first inner cavity 20 after the pressure fluctuations of the measurement-object gas are cancelled through the first diffusion rate controlling portion 11, the buffer space 12, and the second diffusion rate controlling portion 13. Accordingly, the pressure fluctuations of the measurement-object gas introduced to the first inner cavity 20 are reduced to an almost negligible level. The first inner cavity 20 is provided as a space for adjusting the oxygen partial pressure in the measurement-object gas having been introduced through the second diffusion rate controlling portion 13. The oxygen partial pressure is adjusted by operation of a main pump cell 21.

The main pump cell 21 is an electrochemical pump cell constituted by an inner pump electrode 22 including a ceiling electrode portion 22a that is formed over substantially an entire partial region of the lower surface of the second solid electrolyte layer 6, the partial region being positioned to face the first inner cavity 20, by an outer pump electrode 23 formed in a region of an upper surface of the second solid electrolyte layer 6 to be exposed to the external space, the region opposing to the ceiling electrode portion 22a, and by the second solid electrolyte layer 6 sandwiched between the above two pump electrodes.

The inner pump electrode 22 is formed by utilizing not only the upper and lower solid electrolyte layers (i.e., the second solid electrolyte layer 6 and the first solid electrolyte layer 4) which define the first inner cavity 20, but also the spacer layer 5 defining opposite sidewalls of the first inner cavity 20. More specifically, the ceiling electrode portion 22a is formed in a partial region of the lower surface of the second solid electrolyte layer 6, the partial region defining a ceiling surface of the first inner cavity 20, and a bottom electrode portion 22b is formed in a partial region of the upper surface of the first solid electrolyte layer 4, the partial region defining a bottom surface of the first inner cavity 20. Furthermore, side electrode portions (not illustrated) are formed in partial regions of sidewall surfaces (inner surfaces) of the spacer layer 5, the partial regions defining the opposite sidewalls of the first inner cavity 20, to connect the ceiling electrode portion 22a and the bottom electrode portion 22b. Thus, the inner pump electrode 22 is provided in a tunnel-like structure in a region where the side electrode portions are disposed.

The inner pump electrode 22 and the outer pump electrode 23 are each formed as a porous cermet electrode (e.g., a cermet electrode made of Pt and $ZrO_2$ and containing 1% of Au). It is to be noted that the inner pump electrode 22 contacting the measurement-object gas is made of a material having a weakened reducing ability with respect to NOx components in the measurement-object gas.

By applying a desired pump voltage Vp0 between the inner pump electrode 22 and the outer pump electrode 23 such that a pump current Ip0 flows in a positive direction or a negative direction between the inner pump electrode 22 and the outer pump electrode 23, the main pump cell 21 can pump out oxygen within the first inner cavity 20 to the external space or can pump oxygen in the external space into the first inner cavity 20.

Moreover, in order to detect the oxygen concentration (oxygen partial pressure) in an atmosphere within the first inner cavity 20, an electrochemical sensor cell, i.e., an oxygen-partial-pressure detection sensor cell 80 for main pump control, is constituted by the inner pump electrode 22, the second solid electrolyte layer 6, the spacer layer 5, the first solid electrolyte layer 4, the third substrate layer 3, and the reference electrode 42.

The oxygen concentration (oxygen partial pressure) within the first inner cavity 20 can be determined by measuring electromotive force V0 in the oxygen-partial-pressure detection sensor cell 80 for main pump control. In addition, the pump current Ip0 is controlled by performing feedback-control of the pump voltage Vp0 of a variable power supply 25 such that the electromotive force V0 is kept constant. As a result, the oxygen concentration within the first inner cavity 20 can be held at a predetermined constant value.

The third diffusion rate controlling portion 30 applies predetermined diffusion resistance to the measurement-object gas of which oxygen concentration (oxygen partial pressure) has been controlled in the first inner cavity 20 by the operation of the main pump cell 21, and then introduces the measurement-object gas to the second inner cavity 40.

The second inner cavity 40 is provided as a space in which a process of measuring a concentration of nitrogen oxides (NOx) in the measurement-object gas having been introduced through the third diffusion rate controlling portion 30 is performed. In the second inner cavity 40 in which the oxygen concentration has been adjusted mainly by an auxiliary pump cell 50, the NOx concentration is measured by further operating a measurement pump cell 41.

In the second inner cavity 40, the oxygen partial pressure is further adjusted by the auxiliary pump cell 50 on the measurement-object gas that is introduced to the second inner cavity 40 through the third diffusion rate controlling portion 30 after the oxygen concentration (oxygen partial pressure) has been previously adjusted in the first inner cavity 20. Accordingly, the oxygen concentration in the second inner cavity 40 can be kept constant with high accuracy. Hence highly-accurate measurement of the NOx concentration can be performed in the gas sensor 100.

The auxiliary pump cell 50 is an auxiliary electrochemical pump cell constituted by an auxiliary pump electrode 51 including a ceiling electrode portion 51a that is formed over substantially an entire partial region of the lower surface of the second solid electrolyte layer 6, the partial region being positioned to face the second inner cavity 40, by the outer pump electrode 23 (an appropriate electrode outside the sensor element 101 may also be used without being limited to the outer pump electrode 23), and by the second solid electrolyte layer 6.

The auxiliary pump electrode 51 is formed within the second inner cavity 40 in a tunnel-like structure similarly to the above-described inner pump electrode 22 formed in the first inner cavity 20. More specifically, the tunnel structure is constituted as follows. A ceiling electrode portion 51a is formed in a partial region of the second solid electrolyte layer 6, the partial region defining a ceiling surface of the second inner cavity 40, and a bottom electrode portion 51b is formed in a partial region of the first solid electrolyte layer 4, the partial region defining a bottom surface of the second inner cavity 40. Furthermore, side electrode portions (not illustrated) connecting the ceiling electrode portion 51a and the bottom electrode portion 51b are formed in partial regions of the sidewall surfaces of the spacer layer 5, the partial regions defining opposite sidewalls of the second inner cavity 40. As in the inner pump electrode 22, the auxiliary pump electrode 51 is also made of a material having a weakened reducing ability with respect to NOx components in the measurement-object gas.

By applying a desired pump voltage Vp1 between the auxiliary pump electrode 51 and the outer pump electrode 23, the auxiliary pump cell 50 can pump out oxygen in an atmosphere within the second inner cavity 40 to the external space or can pump oxygen into the second inner cavity 40 from the external space.

Moreover, in order to control the oxygen partial pressure in the atmosphere within the second inner cavity 40, an electrochemical sensor cell, i.e., an oxygen-partial-pressure detection sensor cell 81 for auxiliary pump control, is constituted by the auxiliary pump electrode 51, the reference electrode 42, the second solid electrolyte layer 6, the spacer layer 5, the first solid electrolyte layer 4, and the third substrate layer 3.

The auxiliary pump cell 50 performs pumping by using a variable power supply 52 of which voltage is controlled in accordance with electromotive force V1 that is detected by the oxygen-partial-pressure detection sensor cell 81 for auxiliary pump control. As a result, the oxygen partial pressure in the atmosphere within the second inner cavity 40 can be controlled to such a low partial pressure level as not substantially affecting the measurement of NOx.

In addition, a pump current Ip1 flowing in the auxiliary pump cell 50 is used to control the electromotive force V0 of the oxygen-partial-pressure detection sensor cell 80 for main pump control. More specifically, the pump current Ip1 is input as a control signal to the oxygen-partial-pressure detection sensor cell 80 for main pump control, and the electromotive force V0 is controlled such that a gradient of the oxygen partial pressure in the measurement-object gas introduced to the second inner cavity 40 through the third diffusion rate controlling portion 30 is always kept constant. When the gas sensor is used as a NOx sensor, the oxygen concentration within the second inner cavity 40 is kept at a constant value of about 0.001 ppm by the action of the main pump cell 21 and the auxiliary pump cell 50.

The measurement pump cell 41 performs, within the second inner cavity 40, the measurement of the NOx concentration in the measurement-object gas. The measurement pump cell 41 is an electrochemical pump cell constituted by a measurement electrode 44 that is formed in a partial region of the upper surface of the first solid electrolyte layer 4, the partial region being positioned to face the second inner cavity 40 at a location away from the third diffusion rate controlling portion 30, the outer pump electrode 23, the second solid electrolyte layer 6, the spacer layer 5, and the first solid electrolyte layer 4.

The measurement electrode 44 is a porous cermet electrode. The measurement electrode 44 functions also as a NOx reducing catalyst that reduces NOx present in the atmosphere within the second inner cavity 40. Furthermore, the measurement electrode 44 is covered with a fourth diffusion rate controlling portion 45.

The fourth diffusion rate controlling portion 45 is a film made of a ceramic porous body. The fourth diffusion rate controlling portion 45 not only takes a role of limiting an amount of NOx flowing into the measurement electrode 44, but also functions as a protective film for the measurement electrode 44. In the measurement pump cell 41, oxygen generated by decomposition of nitrogen oxides in an atmosphere around the measurement electrode 44 can be pumped out, and an amount of the generated oxygen can be detected as a pump current Ip2.

Moreover, in order to detect the oxygen partial pressure around the measurement electrode 44, an electrochemical sensor cell, i.e., an oxygen-partial-pressure detection sensor cell 82 for measurement pump control, is constituted by the first solid electrolyte layer 4, the third substrate layer 3, the measurement electrode 44, and the reference electrode 42. A variable power supply 46 is controlled in accordance with electromotive force V2 detected by the oxygen-partial-pressure detection sensor cell 82 for measurement pump control.

The measurement-object gas introduced to the second inner cavity 40 reaches the measurement electrode 44 through the fourth diffusion rate controlling portion 45 under condition that the oxygen partial pressure is controlled. The nitrogen oxides in the measurement-object gas around the measurement electrode 44 are reduced ($2NO \rightarrow N_2+O_2$), whereby oxygen is generated. The generated oxygen is pumped out by the measurement pump cell 41. On that occasion, a voltage Vp2 of the variable power supply 46 is controlled such that the electromotive force V2 detected by the oxygen-partial-pressure detection sensor cell 82 for measurement pump control is kept constant. Because an amount of the oxygen generated around the measurement electrode 44 is proportional to a concentration of the nitrogen oxides in the measurement-object gas, the concentration of the nitrogen oxides in the measurement-object gas can be calculated from the pump current Ip2 in the measurement pump cell 41.

Moreover, by combining the measurement electrode 44, the first solid electrolyte layer 4, the third substrate layer 3, and the reference electrode 42 to constitute an oxygen partial pressure detection device in the form of an electrochemical sensor cell, it is also possible to detect electromotive force corresponding to a difference between an amount of the oxygen generated by reduction of the NOx components in the atmosphere around the measurement electrode 44 and an amount of oxygen contained in the atmosphere as a reference, and hence to determine the concentration of the NOx components in the measurement-object gas from the detected electromotive force.

In addition, an electrochemical sensor cell 83 is constituted by the second solid electrolyte layer 6, the spacer layer 5, the first solid electrolyte layer 4, the third substrate layer 3, the outer pump electrode 23, and the reference electrode 42. The oxygen partial pressure in the measurement-object gas outside the gas sensor can be detected from electromotive force Vref obtained by the electrochemical sensor cell 83.

In the gas sensor 100 having the above-described structure, the measurement-object gas is applied to the measurement pump cell 41 under the condition that the oxygen partial pressure in the measurement-object gas is always kept at such a constant low value (as not substantially affecting the measurement of NOx) by the operation of both the main pump cell 21 and the auxiliary pump cell 50. Accordingly, the NOx concentration in the measurement-object gas can be determined in accordance with the pump current Ip2 that flows with pumping-out of oxygen by the measurement pump cell 41, the oxygen being generated due to reduction of NOx in almost proportion to the NOx concentration in the measurement-object gas.

In order to increase the oxygen ion conductivity of the solid electrolyte, the sensor element 101 includes a heater section 70 that has a role of temperature adjustment by heating the sensor element 101 and holding the temperature thereof. The heater section 70 includes a heater connector electrode 71, a heater 72, a through-hole 73, a heater insulating layer 74, and a pressure release hole 75.

The heater connector electrode 71 is formed in contact with a lower surface of the first substrate layer 1. By connecting the heater connector electrode 71 to an external power supply, electric power can be supplied to the the heater section 70 from the outside.

The heater 72 is an electric resistor formed in a state sandwiched between the second substrate layer 2 and the third substrate layer 3 from below and above, respectively. The heater 72 is connected to the heater connector electrode 71 via the through-hole 73, and it generates heat with supply of the electric power from the external power supply through the heater connector electrode 71, thus heating the solid electrolyte forming the sensor element 101 and holding the temperature thereof. The control device 90 measures the resistance of the heater 72 and converts the measured resistance to a heater temperature. The resistance of the heater 72 can be expressed as a linear function of the heater temperature.

The heater 72 is embedded over an entire region ranging from the first inner cavity 20 to the second inner cavity 40, and it can adjust the temperature in the entirety of the sensor element 101 to a level at which the solid electrolyte is activated.

The heater insulating layer 74 is an insulating layer made of an insulator such as alumina and covering upper and lower surfaces of the heater 72. The heater insulating layer 74 is formed with intent to provide electrical insulation between the second substrate layer 2 and the heater 72 and electrical insulation between the third substrate layer 3 and the heater 72.

The pressure release hole 75 is a component that is provided to penetrate the third substrate layer 3, and communicate with the reference gas introduction space 43, and is formed for the purpose of reducing an internal pressure increase associated with temperature rise in the heater insulating layer 74.

As illustrated in FIGS. 2, 3, the element body 101a is covered in part by the porous protective layer 91. The porous protective layer 91 includes porous protective layers 91a to 91e which are formed in 5 faces out of 6 faces of the element body 101a, respectively. The porous protective layer 91a covers part of the upper face of the element body 101a. The porous protective layer 91b covers part of the lower face of the element body 101a. The porous protective layer 91c covers part of the left face of the element body 101a. The porous protective layer 91d covers part of the right face of the element body 101a. The porous protective layer 91e covers the entire front end face of the element body 101a. Note that the porous protective layers 91a to 91d entirely cover the region of the surface of the element body 101a, on which the porous protective layers are formed, from the front end face of the element body 101a toward a rear position up to distance L (see FIG. 3). In addition, the porous protective layer 91a also covers the portion where the outer side pump electrode 23 is formed. Although the porous protective layer 91e also covers the gas inlet port 10, the porous protective layer 91e is a porous body, thus the measurement-object gas can reach the gas inlet port 10 through the inside of the porous protective layer 91e. The porous protective layer 91 covers part (here, the portion including the front end face of the element body 101a up to the distance L from the front end face) of the element body 101a, and protects the part. The porous protective layer 91 serves the function of reducing the occurrence of crack in the element body 101a due to adherence of water, for example, in the measurement-object gas thereto. In addition, the porous protective layer 91a serves the function of reducing adherence of toxic substances, such as oil content, contained in the measurement-object gas to the outer side pump electrode 23, and of inhibiting deterioration of the outer side pump electrode 23. Note that the distance L is defined in a range of (0<the distance L<the length of the element body 101a in the longitudinal direction) based on a range in which the element body 101a is exposed to the measurement-object gas, and the position of the outer side pump electrode 23 in the gas sensor 100. In the present embodiment, the distance L is greater than the distance from the front end of the element body 101a to the rear end of the outer side pump electrode 23 in the front-rear direction.

The porous protective layer 91 is a porous body, and preferably contains ceramic particles as the constituent particles, and more preferably contains particles of at least one of alumina, zirconia, spinel, cordierite, titania, and magnesia. In the present embodiment, the porous protective layer 91 is assumed to be composed of an alumina porous body. The porosity of the porous protective layer 91 is 5 volume % to 40 volume %, for example. The porosity of the porous protective layer 91 may be 20 volume % or more. The thickness of the porous protective layer 91 may be, for example, 100 μm or more, or may be 300 μm or more. The thickness of the porous protective layer 91 may be, for example, 500 μm or less, or may be 400 μm or less.

Figure 4:
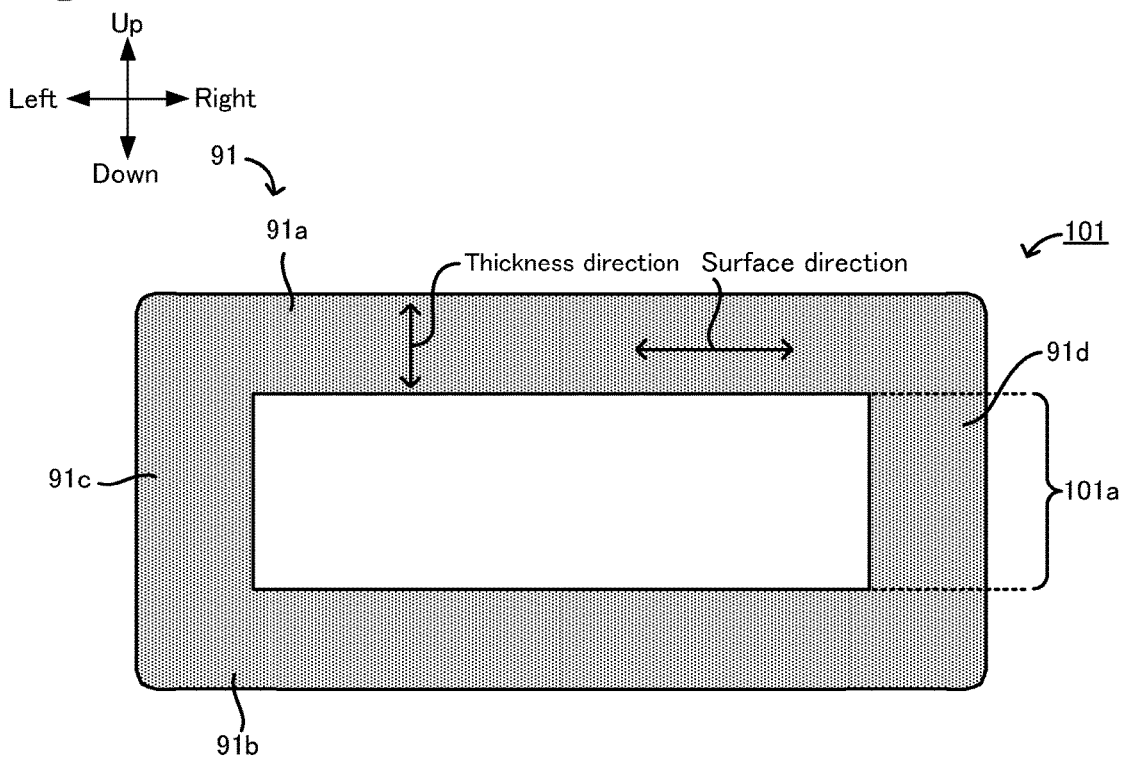

In the porous protective layer 91a, the thermal conductivity ratio R (=λs/λt) of the surface direction thermal conductivity λs [W/mK] to the thickness direction thermal conductivity λt [W/mK] is 1.6 or higher. FIG. 4 is an explanatory view illustrating the surface direction and the thickness direction of the porous protective layer 91a. FIG. 4 is a cross-sectional view of the sensor element 101 in up-down and right-left directions. As illustrated in FIG. 4, the direction along the surface (the upper face of the element body 101a) on which the porous protective layer 91a is disposed, in other words, a front-rear right-left direction is the surface direction of the porous protective layer 91a. In addition, the direction perpendicular to the surface direction of the porous protective layer 91a, in other words, an up-down direction is the thickness direction of the porous protective layer 91a. The surface direction thermal conductivity λs of the porous protective layer 91a was calculated as the product of a thermal diffusion rate in the surface direction, the specific heat, and the density, the thermal diffusion rate being measured using the porous protective layer 91a cut out from the sensor element 101. The thermal diffusion rate in the surface direction was measured by an AC method in compliance with ISO 22007-3. The specific heat was measured by a differential scanning calorimeter (DSC) in compliance with JIS-K7123. The density was calculated from the weight and the volume measured by a caliper. The thickness direction thermal conductivity λt of the porous protective layer 91a was calculated as the product of a thermal diffusion rate in a thickness direction, the specific heat, and the density, the thermal diffusion rate being measured using the porous protective layer 91a cut out from the sensor element 101. The thermal diffusion rate in the thickness direction was measured by the laser flash method in compliance with JIS-R1611. The specific heat and the density are assumed to be the same as the values used to derive the surface direction thermal conductivity λs.

For the porous protective layers 91b to 91e also, a thermal conductivity ratio R can be derived by respectively measuring the surface direction thermal conductivity λs and the thickness direction thermal conductivity λt in the same manner as mentioned above. The surface direction of any one of the porous protective layers 91b to 91e is the direction along the face, of the element body 101a, on which the one of the porous protective layer 91b to 91e is disposed. For example, the surface direction of the porous protective layer 91c is an up-down front-rear direction, and the surface direction of the porous protective layer 91e is an up-down right-left direction.

In the present embodiment, in each of the porous protective layers 91a to 91e, the thermal conductivity ratio R is assumed to be 1.6 or higher. In other words, it is assumed that the porous protective layer 91 satisfies that "the thermal conductivity ratio R≥1.6" as a whole.

Next, a method of manufacturing such a gas sensor 100 will be described. In the method of manufacturing the gas sensor 100, the element body 101a is first manufactured, then the sensor element 101 is manufactured by forming the porous protective layer 91 on the element body 101a.

A method of manufacturing the element body 101a will be described. First, six uncalcined ceramic green sheets are prepared. Then, a pattern, such as an electrode, an insulating layer, a heater, is printed on each of the ceramic green sheets corresponding to the first substrate layer 1, the second substrate layer 2, the third substrate layer 3, the first solid electrolyte layer 4, the spacer layer 5, and the second solid electrolyte layer 6. Next, the six ceramic green sheets, on which various patterns are formed, are layered to form a layered body. The layered body is cut into pieces, each of which has the size of the element body 101a, and is calcined at a predetermined calcination temperature to obtain the element body 101a.

Figure 5:
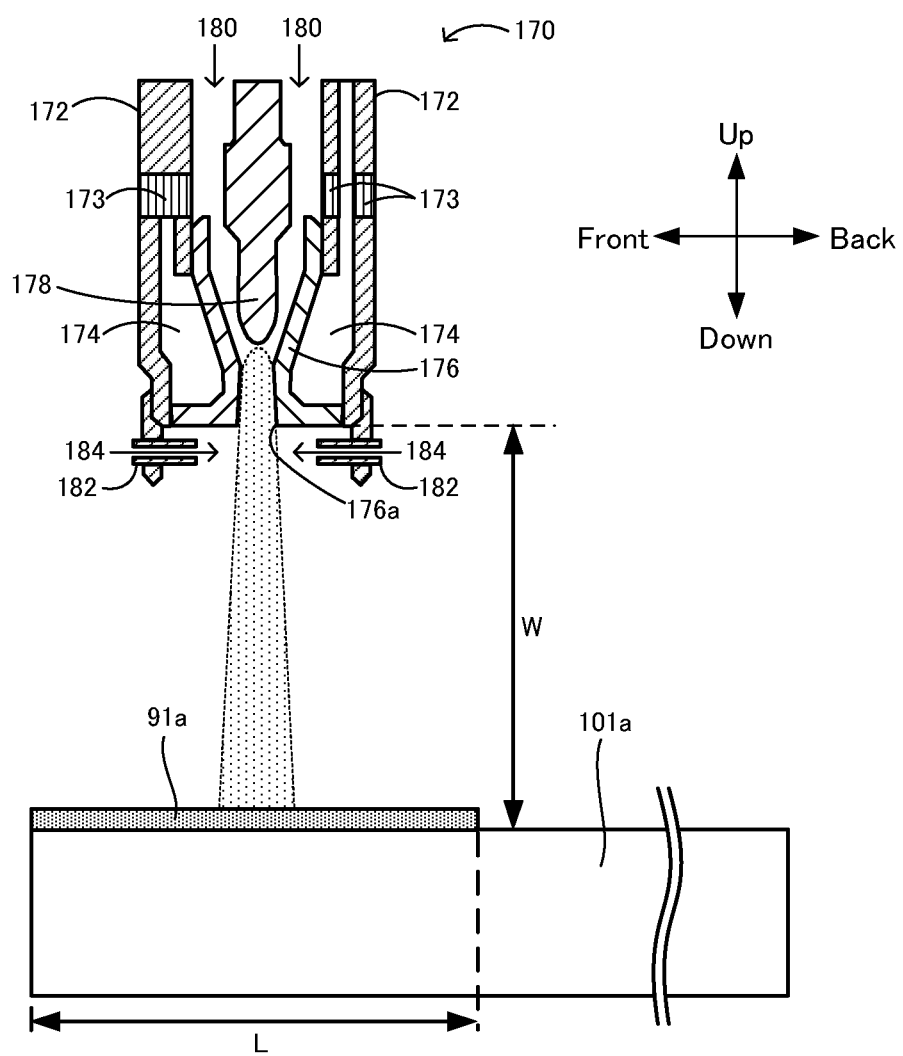
FIG. 5 is an explanatory view of plasma thermal spray using a plasma gun 170.

Next, a method of forming the porous protective layer 91 on the element body 101a will be described. In the present embodiment, the porous protective layers 91a to 91e are formed one by one by plasma thermal spray. FIG. 5 is an explanatory view of plasma thermal spray using a plasma gun 170. Note that FIG. 5 illustrates the manner in which the porous protective layer 91a is formed as an example, and illustrates the plasma gun 170 in a cross-section. The plasma gun 170 includes an anode 176 and a cathode 178 which are electrodes to generate a plasma, and a substantially cylindrical outer periphery 172 that covers them. The outer periphery 172 includes an insulating part (insulator) 173 to insulate from the anode 176. At the lower end of the outer periphery 172, a powder supply unit 182 is formed to supply a powder thermal spray material 184 which is a formation material for the porous protective layer 91. A water-cooling jacket 174 is provided between the outer periphery 172 and the anode 176, thereby making it possible to cool the anode 176. The anode 176 is formed in a cylindrical shape, and has a nozzle 176a which is open downward. A gas 180 for plasma generation is supplied between the anode 176 and the cathode 178 from an upper position.

When the porous protective layer 91a is formed, a voltage is applied across the anode 176 and the cathode 178 of the plasma gun 170, and in the presence of the supplied gas 180 for plasma generation, arc discharge is performed to cause the gas 180 for plasma generation to assume a high temperature plasma state. The gas in a plasma state is ejected from the nozzle 176a as a high-temperature and high-speed plasma jet. In contrast, the powder thermal spray material 184 is supplied from the powder supply unit 182 along with a carrier gas. Thus, the powder thermal spray material 184 is heated to melt and accelerated by the plasma, and collides with the surface (the upper face) of the element body 101a to solidify rapidly, thus the porous protective layer 91a is formed.

For example, an inert gas such as an argon gas can be used as the gas 180 for plasma generation. The flow rate of the argon gas is, for example, 40 to 50 L/min, and the supply pressure thereof is, for example, 0.5 to 0.6 MPa. The voltage applied across the anode 176 and the cathode 178 is, for example, a DC voltage of 80 to 90 V, and the current is, for example, 300 to 400 A.

The powder thermal spray material 184 is the powder which serves as the material for the porous protective layer 91 described above, and is alumina powder in the present embodiment. The particle size of the powder thermal spray material 184 is preferably 1 μm to 50 μm, for example, and is more preferably 20 μm to 30 μm. For example, argon gas same as the gas 180 for plasma generation can be used as the carrier gas which is used to supply the powder thermal spray material 184. The flow rate of the carrier gas is, for example, 3 to 5 L/min, and the supply pressure thereof is, for example, 0.5 to 0.6 MPa.

When plasma thermal spray is performed, it is preferable that distance W between the nozzle 176a which is an exit of the plasma gas in the plasma gun 170, and the face (the upper face of the element body 101a in FIG. 5) of the sensor element body 101a, on which the porous protective layer 91 is formed be 150 mm to 200 mm. In the present embodiment, the distance W is set to 180 mm. Although plasma thermal spray may be performed according to the area where the porous protective layer 91 is formed while the plasma gun 170 is being moved (moved in the right-left direction in FIG. 5) as appropriate, even in that case, it is preferable that the distance W be maintained in the above-mentioned range. The time during which plasma thermal spray is performed may be determined as appropriate according to the film thickness and the area of the porous protective layer 91 to be formed. When the porous protective layer 91 is formed on part (the region from the front end toward a rear position up to distance L) of the surface of element body 101a like the porous protective layer 91a to the porous protective layer 91d, the region where the porous protective layer 91 is not formed may be covered by a mask.

The thermal conductivity ratio R of the porous protective layer 91 can be adjusted by adjusting at least one of the material and the particle size of the powder thermal spray material 184, adding not only the powder serving as the material for the porous protective layer 91, but also a pore-forming material to the powder thermal spray material 184, adjusting the material, particle size, addition ratio of the pore-forming material, or not adding the pore-forming material. In addition, the thermal conductivity ratio R of the porous protective layer 91 can also be adjusted by adjusting the conditions (the flow rate of the gas 180 for plasma generation, the supply pressure, the applied voltage, and the current) at the time of plasma generation, and the above-described distance W. For example, when the shape of the constituent particles of the porous protective layer 91 in the thickness direction becomes more crushed, the number of particles in the thickness direction in the porous protective layer 91 increases, and the number of particles in the surface direction decreases, thus the thermal conductivity ratio R is likely to increase. Therefore, the thermal conductivity ratio R can also be adjusted by setting the thermal conductivity ratio R to a relatively high value by adjusting the conditions at the time of plasma generation so that the constituent particles have a shape crushed in the thickness direction. For example, the powder thermal spray material 184 is likely to melt by setting the applied voltage and the current to relatively high values, and the constituent particles are likely to have a shape crushed in the thickness direction when colliding with the surface of the sensor element body 101a.

The porous protective layers 91b to 91e are also formed one by one similarly except that each porous protective layer is formed on a different surface of the element body 101a. The plasma thermal spray is performed in an atmosphere of air and normal temperature, for example. Two or more of the porous protective layers 91a to 91e may be formed at the same time. By the process above, the porous protective layers 91a to 91e are formed on the upper, lower, right, left faces and the front face of the element body 101a, respectively to produce the porous protective layer 91, and the sensor element 101 is obtained.

When the sensor element 101 is obtained, it is caused to penetrate a supporter 124, and a powder compact 126 which have been prepared, these components are inserted into a through-hole inside a main metal fitting 122 from the upper side of FIG. 1, and the sensor element 101 is fixed by the element sealing body 120. Then, the gas sensor 100 is obtained by attaching the nut 130 and the protective cover 110 thereto.

When thus formed gas sensor 100 is used, a measurement-object gas in the installed pipe 140 flows into the protective cover 110 to reach the sensor element 101, and passes through the porous protective layer 91 to flow into the gas inlet port 10. The sensor element 101 then detects the NOx concentration in the measurement-object gas which has flowed into the gas inlet port 10. At this point, the water contained in the measurement-object gas may also enter the protective cover 110, and may adhere to the surface of the porous protective layer 91. As described above, the element body 101a is adjusted to a temperature (for example, 800° C.) at which a solid electrolyte is activated by the heater 72, and when water adheres to the sensor element 101, the temperature drops suddenly and crack may occur in the element body 101a. Here, the higher the thermal conductivity ratio R (=the surface direction thermal conductivity $\lambda s$/the thickness direction thermal conductivity $\lambda t$) of the porous protective layer 91, thermal conduction in the surface direction (the direction perpendicular to the thickness direction) of the porous protective layer 91 is more likely to occur than thermal conduction in the thickness direction of the porous protective layer 91, thus when water adheres to the surface of the porous protective layer 91, the occurrence of sudden cooling of only part of the element body 101a is reduced. Since the thermal conductivity ratio R is 1.6 or higher, the effect of reducing the occurrence of crack due to sudden cooling of only part of the element body 101a, in other words, the effect of improving the waterproofing performance of the sensor element 101 is obtained. The higher the thermal conductivity ratio R, the more the waterproofing performance is improved. Thus, the thermal conductivity ratio R is preferably 2.0 or higher. The thermal conductivity ratio R may be 2.5 or lower.

In addition, the lower the thickness direction thermal conductivity $\lambda t$, the more thermal conduction in the thickness direction of the porous protective layer 91 is reduced, thus the waterproofing performance is likely to be improved. Thus, the thickness direction thermal conductivity $\lambda t$ is preferably 1.6 W/mK or lower, more preferably 1.0 W/mK or lower, and further more preferably 0.5 W/mK or lower. The thickness direction thermal conductivity $\lambda t$ may be 0.3 W/mK or higher.

The higher the surface direction thermal conductivity $\lambda s$, thermal conduction in the surface direction of the porous protective layer 91 is more likely to occur, and the waterproofing performance is likely to be improved. Thus, the surface direction thermal conductivity $\lambda s$ is preferably 0.9 W/mK or higher, more preferably 1.0 W/mK or higher, further more preferably 2.0 W/mK or higher, and even more preferably 2.5 W/mK or higher. The surface direction thermal conductivity $\lambda s$ may be 3.0 W/mK or lower.

Here, the correspondence between the components of the present embodiment and the components of the present invention will be clarified. The sensor element 101 of the present embodiment corresponds to the gas sensor element of the present invention, the element body 101a corresponds to the element body, and the porous protective layer 91 corresponds to the protective layer. In addition, the outer side pump electrode 23 corresponds to the outer side electrode, the front end face of the element body 101a, covered by the porous protective layer 91e corresponds to one end face of the element body in the longitudinal direction, and the element sealing body 120 corresponds to the fixing member.

In the gas sensor 100 of the present embodiment described above, the sensor element 101 includes the element body 101a including oxygen-ion-conductive solid electrolyte layers (layers 1 to 6), and the porous protective layer 91 that covers at least part of the element body 101a. Since the thermal conductivity ratio R of the porous protective layer 91 is 1.6 or higher, the waterproofing performance of the sensor element 101 can be improved.

In addition, since the thickness of the porous protective layer 91 is 300 μm or more, the waterproofing performance of the sensor element 101 is unlikely to be insufficient.

Furthermore, the sensor element 101 includes the outer side pump electrode 23 disposed outside the element body 101a, and the porous protective layer 91 covers at least the outer side pump electrode 23. Consequently, the porous protective layer 91 can also serve the function of protecting the outer side pump electrode 23 against the toxic substances contained in the measurement-object gas.

The element body 101a has an elongate rectangular parallelepiped shape, and the porous protective layer 91 covers one end face (front end face) of the element body 101a in a longitudinal direction, and the region from the one end face side of four faces perpendicular to the one end face up to the distance L of the element body 101a in the longitudinal direction (where 0<the distance L<the length of the element body in the longitudinal direction). The porous protective layer 91 covers five faces (here, the upper, lower, right, left faces and the front face) of the element body 101a in this manner, thus as compared with when the porous protective layer 91 covers four faces or less of the element body 101a, for example, the waterproofing performance of the sensor element 101 is further improved.

Note that the present invention is not limited to the embodiment described above in any way, and it goes without saying that the present invention can be implemented in various modes as long as it belongs to the technical scope of the present invention.

For example, in the embodiment described above, each of the porous protective layers 91a to 91e is assumed to have a thermal conductivity ratio R of 1.6 or higher. However, this is not always the case. It is sufficient that at least one of the porous protective layers 91a to 91e have a thermal conductivity ratio R of 1.6 or higher. When even one of the porous protective layers 91a to 91e has a thermal conductivity ratio R of 1.6 or higher, the effect of improving the waterproofing performance is obtained for the one porous protective layer. However, it is preferable that a greater number of porous protective layers of the porous protective layers 91a to 91e have a thermal conductivity ratio R of 1.6 or higher. Also, crack is likely to occur particularly in the space between a measurement-object gas flow section and one of the upper, lower, right, left faces of the element body 101a, and the one face (the upper face of the element body 101a in the above-described embodiment) having the least distance from the measurement-object gas flow section. Thus, in the above-described embodiment, the thermal conductivity ratio R of at least the porous protective layer 91a of the porous protective layers 91a to 91e is preferably 1.6 or higher.

In the embodiment described above, the porous protective layer 91 is assumed to have the porous protective layers 91a to 91e. However, this is not always the case. It is sufficient that the porous protective layer 91 cover at least part of the element body 101a. For example, the porous protective layer 91 may not include one or more of the porous protective layers 91a to 91e.

In the embodiment described above, the porous protective layer 91 is formed by plasma thermal spray. However, this is not always the case. The porous protective layer 91 may be formed by another thermal spray, such as high-speed frame thermal spray, arc thermal spray, laser thermal spray, for example. Alternatively, a coating film using a slurry may be formed on the surface of the element body 101a by another manufacturing method (for example, screen printing, dipping, mold cast method) without being limited to the thermal spray, and the porous protective layer 91 may be formed by calcining the coating film. Such a slurry can be prepared by dispersing the raw material powder (such as ceramic particles) for the porous protective layer 91 in the solvent, for example. Also, it is preferable that at least one of a sintering aid (binder) and a pore-forming material be added to the slurry. When a mold cast method is used, an organic solvent, a dispersing agent and a gelling agent (for example, isocyanates and polyols) are further added to the slurry. When the porous protective layer 91 is formed by calcining a coating film, calcination of the coating film and calcination of the element body 101a may be performed at the same time. In addition, when the porous protective layer 91 is formed using such a slurry, a raw material having a longitudinal direction, for example, a fiber made of ceramic raw materials, such as alumina, may be contained in the slurry. In this case, when the longitudinal direction of the fiber is set to be along the surface direction of the porous protective layer 91, the surface direction thermal conductivity λs tends to increase, thus the thermal conductivity ratio R is likely to increase. For example, when the porous protective layer 91 is formed by dipping, after the element body 101a is immersed in a slurry containing fiber, it is preferable to pull the element body 101a in the longitudinal direction of the element body 101a. In this manner, the longitudinal direction of the fiber in the remaining slurry on the upper, lower, right, left faces of the element body 101a is likely to be along the longitudinal direction of the element body 101a. As a consequence, the thermal conductivity ratio R of the porous protective layers 91a to 91d is likely to increase.

Figure 6:
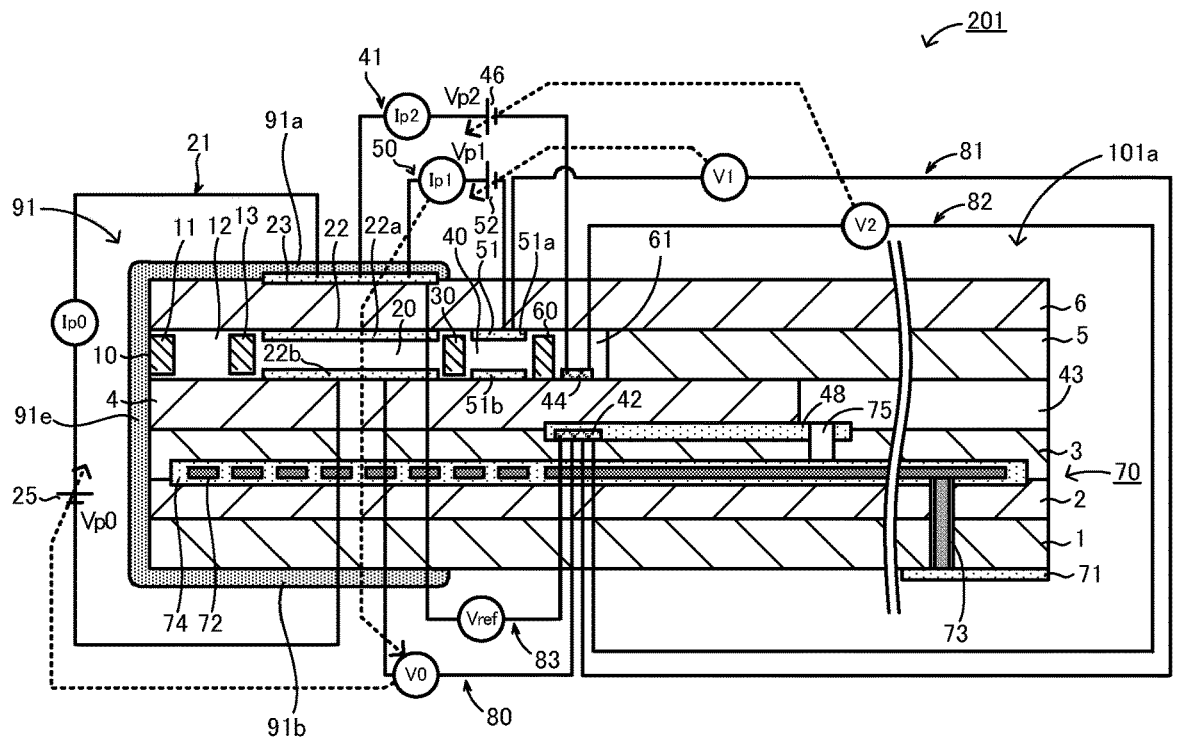
FIG. 6 is a cross-sectional view of another sensor element 201.

In the embodiment described above, the sensor element 101 of the gas sensor 100 includes the measurement electrode 44 covered by the fourth diffusion rate controlling portion 45 in the second inner cavity 40, however, is not particularly limited to this configuration. For example, like the sensor element 201 of FIG. 6, the measurement electrode 44 is not covered but exposed, and a slit-like fourth diffusion rate controlling portion 60 may be provided between the measurement electrode 44 and the auxiliary pump electrode 51. The fourth diffusion rate controlling portion 60 is a section that provides a predetermined diffusion resistance to the measurement-object gas in the second inner cavity 40, and introduces the measurement-object gas to the third inner cavity 61 in the back, the measurement-object gas having an oxygen concentration (oxygen partial pressure) controlled by the operation of the auxiliary pump cell 50. The fourth diffusion rate controlling portion 60 serves the function of limiting the amount of NOx which flows into the third inner cavity 61. Even with the sensor element 201 in such a configuration, NOx concentration can be detected by the pump cell 41 for measurement in the same manner as in the above-described embodiment. Note that in FIG. 6, the same component as in FIG. 1 is labeled with the same symbol.

In the embodiment described above, the element body 101a is a layered body having multiple solid electrolyte layers (layers 1 to 6). However, this is not always the case. It is sufficient that the element body 101a have at least one oxygen-ion-conductive solid electrolyte layer. For example, the layers 1 to 5 other than the second solid electrolyte layer 6 in FIG. 3 may be layers (for example, layers made of alumina) made of a material other than a solid electrolyte layer. In this case, each electrode included in the sensor element 101 may be disposed in the second solid electrolyte layer 6. For example, the measurement electrode 44 of FIG. 3 may be disposed on the lower face of the second solid electrolyte layer 6. Also, the reference gas inlet space 43 may be provided in the spacer layer 5 instead of the first solid electrolyte layer 4, the atmosphere inlet layer 48 may be provided between the second solid electrolyte layer 6 and spacer layer 5 instead of between the first solid electrolyte layer 4 and the third substrate layer 3, and the reference electrode 42 may be provided rearwardly of the second inner cavity 40 and on the lower face of the second solid electrolyte layer 6.

In the embodiment described above, the gas sensor 100 that detects NOx concentration has been illustrated, however, the present invention may be applied to a gas sensor that detects an oxygen concentration and a gas sensor that detects an ammonia concentration.

EXAMPLES

Hereinafter, an example of manufacturing a sensor element specifically will be described as an example. Experimental Examples 1 to 4 correspond to the examples of the present invention, and Experimental Examples 5 to 7 correspond to comparative examples. Note that the present invention is not limited to the following examples.

Experimental Example 1

According to the method of manufacturing the sensor element 101 in the embodiment described above, the sensor element 101 illustrated in FIGS. 2, 3 is produced, which provides Experimental Example 1. Specifically, first, the element body 101a was manufactured, in which the length in the front-rear direction is 67.5 mm, the width in the right-left direction is 4.25 mm, and the thickness in the up-down direction is 1.45 mm. Note that when the element body 101a is manufactured, zirconia particles with 4 mol % yttria serving as a stabilizer added, an organic binder, and an organic solvent were mixed, and ceramic green sheets were molded by tape casting.

Subsequently, the porous protective layers 91a, 91b, 91c, 91d, 91e are formed on the surface of the element body 101a to obtain the porous protective layer 91 which provides the sensor element 101 of Experimental Example 1. The conditions for plasma thermal spray to form the porous protective layer 91 are as follows: An argon gas (flow rate of 50 L/min) was used as the gas 180 for plasma generation. The voltage applied across the anode 176 and the cathode 178 was a DC voltage of 82 V. The current was 350 A. As the powder thermal spray material 184, powder was used, in which a pore-forming material is added to alumina powder having an average particle size of 20 to 30 μm. The carrier gas used to supply the powder thermal spray material 184 was an argon gas (flow rate of 5 L/min). The distance W was 180 mm. The distance L was 10 mm. The plasma thermal spray was performed in an atmosphere of air and normal temperature. The thicknesses of the porous protective layers 91a to 91e formed were measured by a micrometer, and each thickness was 300 μm. In addition, the surface direction thermal conductivity λs of the porous protective layer 91a was measured by the above-described method, and found to be 0.94 W/mK. The thickness direction thermal conductivity λt of the porous protective layer 91a was measured by the above-described method, and found to be 0.38 W/mK. For a measurement of these, the surface direction thermal diffusion rate was measured using an AC method thermal constant measuring device (Laser PIT) manufacture by Ulvac-Riko. The thickness direction thermal diffusion rate was measured using the laser flash method thermal constant measuring device (TC7000) manufacture by Ulvac-Riko. The specific heat was measured using the differential scanning calorimeter (DSC) (TG-DTA2000SR) manufacture by BRUKER. Thus, the thermal conductivity ratio R of the porous protective layer 91a was 2.47 (=0.94/0.38). At the time of measurement of the later-described waterproofing amount, a water droplet is dropped on the porous protective layer 91a, thus the thermal conductivities λs, λt and the thermal conductivity ratio R are each measured as the value for the porous protective layer 91a. However, for each of the porous protective layers 91b to 91e in Experimental Example 1, the thermal conductivities λs, λt and the thermal conductivity ratio R were approximately equal to the values for the porous protective layer 91a.

Experimental Examples 2 to 7

In each Experimental Example, a pore-forming material was added as necessary while adjusting the average particle size of the powder thermal spray material 184 so as to achieve a desired characteristic, and other than this, the sensor elements 101 in Experimental Examples 2 to 7 were manufactured in the same manner as in Experimental Example 1. Specifically, in Experimental Example 2, powder in which a pore-forming material is added to alumina was used as the powder thermal spray material 184. In Experimental Examples 3, 4, powder in which a pore-forming material is added to spinel was used as the powder thermal spray material 184. In Experimental Example 5, powder in which a pore-forming material is added to zirconia was used as the powder thermal spray material 184. In Experimental Example 6, spinel powder was used as the powder thermal spray material 184. In Experimental Example 7, alumina powder was used as the powder thermal spray material.

[Evaluation of Waterproofing Performance]

For the sensor element 101 in Experimental Examples 1 to 7, the performance (waterproofing performance of the sensor element 101) of the porous protective layer 91 was evaluated. Specifically, first, the heater 72 was energized to achieve a temperature at 800° C., and the sensor element 101 was heated. In this state, the main pump cell 21, the auxiliary pump cell 50, the oxygen partial pressure detection sensor cell 80 for main pump control, the oxygen partial pressure detection sensor cell 81 for auxiliary pump control were operated in an air atmosphere, and the oxygen concentration in the first inner cavity 20 was controlled to maintain it at a predetermined constant value. After waiting for the pump current Ip0 to be stabilized, water droplet is dropped on the porous protective layer 91a, and an occurrence of crack of the sensor element 101 was determined based on whether or not the pump current Ip0 has changed to a value exceeding a predetermined threshold. When crack occurs in the sensor element 101 due to thermal shock of the water droplet, oxygen is likely to flow into the first inner cavity 20 through a crack portion, thus the value of the pump current Ip0 increases. Thus, when the pump current Ip0 exceeds a predetermined threshold defined in the experiment, it is determined that crack has occurred in the sensor element 101 due to the droplet of water. Also, multiple experiments were performed with gradually increased amount of water droplets, and the greatest amount of water droplets with which no crack has occurred is defined as the waterproofing amount. Then, 10 sensor elements 101 for Experimental Examples 1 to 7 were prepared, and the average value of 10 waterproofing amounts was derived for each of Experimental Examples 1 to 7. The waterproofing performance of each sensor element 101 in Experimental Examples 1 to 7 was evaluated, where the average value of the waterproofing amounts less than 9 μL indicates poor performance, and the average value greater than or equal to 9 μL indicates good performance.

Figure 7:
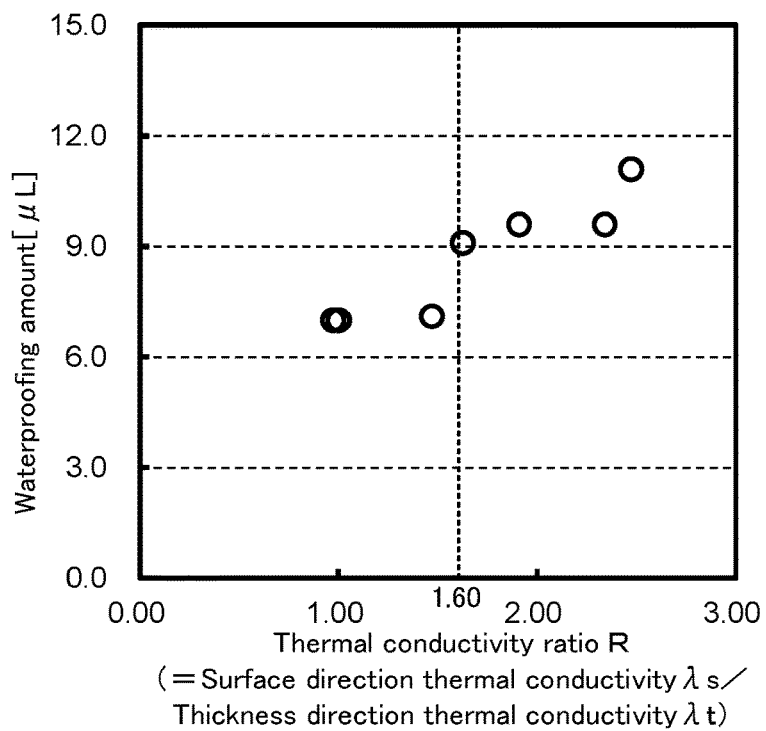
FIG. 7 is a graph illustrating a relationship between thermal conductivity ratio R and waterproofing amount in Experimental Examples 1 to 7.

Table 1 collectively shows the thickness direction thermal conductivity λt, the surface direction thermal conductivity λs, the thermal conductivity ratio R, the waterproofing amount, and the evaluation results of Experimental Examples 1 to 7. FIG. 7 is a graph illustrating a relationship between the thermal conductivity ratio R and the waterproofing amount in Experimental Examples 1 to 7.

TABLE 1

|  | Thickness direction thermal conductivity λt[W/(m · K)] | Surface direction thermal conductivity λt[W/(m · K)] | Thermal conductivity ratio R(= λs/λt) | Waterproofing amount [μL] | Evaluation results |
|---|---|---|---|---|---|
| Experimental Example 1 | 0.38 | 0.94 | 2.47 | 11.1 | Good performance |
| Experimental Example 2 | 0.41 | 0.96 | 2.34 | 9.6 | Good performance |
| Experimental Example 3 | 1.10 | 2.10 | 1.91 | 9.6 | Good performance |
| Experimental Example 4 | 1.60 | 2.60 | 1.63 | 9.1 | Good performance |
| Experimental Example 5 | 0.66 | 0.97 | 1.47 | 7.1 | Poor performance |
| Experimental Example 6 | 3.40 | 3.40 | 1.00 | 7.0 | Poor performance |
| Experimental Example 7 | 4.00 | 3.90 | 0.98 | 7.0 | Poor performance |

As seen from Table 1 and FIG. 7, in Experimental Examples 1 to 4 in which the thermal conductivity ratio R is 1.6 or higher, the waterproofing amount is 9 μL or more, and it was confirmed that the waterproofing performance is high. From comparison between Experimental Examples 1 to 4, it was confirmed that the higher the thermal conductivity ratio R, the greater the waterproofing amount, in other words, the waterproofing performance is improved. In addition, in Experimental Example 5, even if the thickness direction thermal conductivity λt is small, when the thermal conductivity ratio R is lower than 1.6, the waterproofing performance was poor. From this result, maintaining the value of the thermal conductivity ratio R at 1.6 or higher rather than reducing the value of the thickness direction thermal conductivity λt probably contributes to the improvement of the waterproofing performance.

What is claimed is:

1. A gas sensor element comprising:
   an element body including an oxygen-ion-conductive solid electrolyte layer; and
   a protective layer that covers at least part of the element body, and has a thermal conductivity ratio R of 1.6 or higher, the thermal conductivity ratio R ($=\lambda s/\lambda t$) being a surface direction thermal conductivity $\lambda s$ [W/m K] to a thickness direction thermal conductivity $\lambda t$ [W/m K].

2. The gas sensor element according to claim 1,
   wherein the protective layer has the thickness direction thermal conductivity $\lambda t$ of 1.6 W/mK or lower.

3. The gas sensor element according to claim 1,
   wherein the protective layer has a thickness of 300 μm or more.

4. The gas sensor element according to claim 1, further comprising
   an outer side electrode disposed outside of the element body,
   wherein the protective layer covers at least the outer side electrode.

5. The gas sensor element according to claim 1,
   wherein the element body has an elongate rectangular parallelepiped shape, and
   the protective layer covers one end face of the element body in a longitudinal direction, and a region from the one end face side of four faces perpendicular to the one end face up to a distance L of the element body in the longitudinal direction (where 0<the distance L<a length of the element body in the longitudinal direction).

6. A gas sensor comprising
   the gas sensor element according to claim 1.

* * * * *